United States Patent
Hanski et al.

(10) Patent No.: US 10,233,753 B2
(45) Date of Patent: Mar. 19, 2019

(54) ARRANGEMENT FOR INITIATING A REMOTE OPERATION MODE

(71) Applicant: SANDVIK MINING AND CONSTRUCTION OY, Tampere (FI)

(72) Inventors: Sami Hanski, Tampere (FI); Petri Nurminen, Tampere (FI); Jarkko Uotila, Tampere (FI); Lauso Cumini, Tampere (FI); Petri Mannonen, Tampere (FI); Arto Siren, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 0 days.

(21) Appl. No.: 15/117,506

(22) PCT Filed: Feb. 14, 2014

(86) PCT No.: PCT/EP2014/052928
§ 371 (c)(1),
(2) Date: Aug. 9, 2016

(87) PCT Pub. No.: WO2015/120905
PCT Pub. Date: Aug. 20, 2015

(65) Prior Publication Data
US 2016/0348504 A1 Dec. 1, 2016

(51) Int. Cl.
*E21C 35/24* (2006.01)
*E21B 44/00* (2006.01)
(Continued)

(52) U.S. Cl.
CPC .............. *E21C 35/24* (2013.01); *E21B 7/022* (2013.01); *E21B 44/00* (2013.01); *E21C 29/22* (2013.01); *G05D 1/0027* (2013.01); *G05D 1/0282* (2013.01); *G05D 1/0297* (2013.01); *G05D 2201/021* (2013.01)

(58) Field of Classification Search
None
See application file for complete search history.

(56) References Cited

U.S. PATENT DOCUMENTS

| | | | |
|---|---|---|---|
| 8,386,090 B1 * | 2/2013 | Hobbs, Jr. .............. | E02F 9/2058 340/426.13 |
| 2005/0237167 A1 * | 10/2005 | Hager ................... | B60R 25/042 34/426.15 |

(Continued)

FOREIGN PATENT DOCUMENTS

| CN | 201400191 Y | * 2/2010 |
|---|---|---|
| CN | 102767198 A | * 11/2012 |

(Continued)

*Primary Examiner* — Shelley Chen
(74) *Attorney, Agent, or Firm* — Corinne R. Gorski

(57) ABSTRACT

A method for initiating a remote operation mode of a work machine, the method including providing the work machine with a work machine-specific safety key; receiving, at a remote control station, a notification from the work machine in response to initiating the remote operation mode of the work machine by said safety key; acknowledging the work machine as being included in a safety system of the remote control station; and configuring the remote control station to start the remote operation mode of the work machine.

20 Claims, 4 Drawing Sheets

(51) Int. Cl.
*G05D 1/02* (2006.01)
*E21C 29/22* (2006.01)
*E21B 7/02* (2006.01)
*G05D 1/00* (2006.01)

(56) References Cited

U.S. PATENT DOCUMENTS

| | | | |
|---|---|---|---|
| 2007/0200667 A1* | 8/2007 | Matsubara | B60R 25/04 340/5.64 |
| 2009/0256328 A1* | 10/2009 | Dudding | B60G 11/113 280/124.175 |
| 2010/0106344 A1 | 4/2010 | Edwards et al. | |
| 2010/0250023 A1 | 9/2010 | Gudat | |
| 2012/0053775 A1 | 3/2012 | Nettleton et al. | |
| 2012/0248773 A1* | 10/2012 | Whinnery | F02N 11/0866 290/46 |
| 2012/0271505 A1* | 10/2012 | Bryns | G07C 5/0825 701/29.1 |
| 2013/0099892 A1* | 4/2013 | Tucker | G07C 9/00309 340/5.61 |
| 2013/0240300 A1* | 9/2013 | Fagan | B66F 3/46 187/210 |
| 2013/0304286 A1 | 11/2013 | Ehrler et al. | |

FOREIGN PATENT DOCUMENTS

| | | | | |
|---|---|---|---|---|
| DE | 4338114 C1 * | 3/1995 | | G07C 9/00309 |
| WO | 2011051558 A2 | 5/2011 | | |

* cited by examiner

ARRANGEMENT FOR INITIATING A REMOTE OPERATION MODE

RELATED APPLICATION DATA

This application is a § 371 National Stage Application of PCT International Application No. PCT/EP2014/052928 filed Feb. 14, 2014.

FIELD OF THE INVENTION

The present invention relates to work machines, and more particularly to initiating a remote operation mode of a work machine.

BACKGROUND OF THE INVENTION

Various mining vehicles, such as rock drilling equipment, loading equipment and transport equipment, may be manned or unmanned. Unmanned mining vehicles may be remote-controlled by an operator from a control station, for instance, and they may be equipped with measuring instruments suitable for location determination. Unmanned mining vehicles may be operated automatically, e.g. driven along a desired route in the mine, as long as the location of the device can be determined. The automated operation may be carried out in a surface or underground operating area.

There may be a plurality of mining vehicles, also referred to as a fleet, operated simultaneously in the same surface or underground operating area. The fleet is monitored and controlled from a remote control station locating outside the operating area. In surface mining, the remote control station may be provided, for example, in a vehicle, such as a van, where the control station comprises computers equipped with necessary user interfaces, such as one or more displays and appropriate software. A wireless data connection is established between the remote control station and the mining vehicles belonging to the fleet. The mining vehicles send intermittently various sensor data and video describing the operations of the mining vehicle to the control station via the wireless connection. A remote operator may monitor and control the operations of the mining vehicles.

In connection with unmanned, remote controlled and automated mining vehicles, safety has to be taken into account very carefully. Typically, the unmanned mining vehicles are provided with an isolated operation area to which access by outsiders and outside vehicles is prevented in order to eliminate any risk of collision. The isolation may be provided by passage control devices equipped with sensors connected to a safety system. When a signal indicating border crossing is received from a passage control device, a mining vehicle in automated or remote operation is stopped immediately.

Also the software of the remote control stations are provided with many built-in safety functions. For activating a mining vehicle of the fleet to an automated operation mode, the remote operator has to carry out several activation stages, including introducing a new mining vehicle into the fleet, if necessary, selecting the correct mining vehicle from the available fleet, determining the operating area (e.g. a correct tunnel), activating necessary control channels over the wireless connection, etc. All these stages contribute to the safety such that no mining vehicle should be able to be activated by accident.

However, similarly to all operating systems, also the software of the remote control station is typically a compromise between safety and usability. The software may, for example, show data about all mining vehicles ever used by said remote control station, and the remote operator may just select the correct vehicle. While the overwhelming amount of data about all mining vehicles may provide advantages from the usability point of view, it inherently also poses a risk of the remote operator selecting a wrong mining vehicle to be activated.

SUMMARY OF THE INVENTION

An improved method and technical equipment implementing the method has now been developed for improving the safety, when activating a mining vehicle to a remote operation mode. Various aspects of the invention include a method, an apparatus, a work machine and a computer program product, which are characterized by what is stated in the independent claims. Various embodiments of the invention are disclosed in the dependent claims.

According to a first aspect, there is provided a method for initiating a remote operation mode of a work machine, the method comprising: providing the work machine with a work machine-specific safety key; receiving, at a remote control station, a notification from the work machine in response to initiating the remote operation mode of the work machine by said safety key; acknowledging the work machine as being included in a safety system of the remote control station; and configuring the remote control station to start the remote operation mode of the work machine.

According to an embodiment, at least a part of actions relating to the initiation of the remote operation mode are allowed to be taken at the remote control station only if the safety key has been returned to a predetermined safety location.

According to an embodiment, the safety location comprises detection means arranged to detect presence of the safety key, said detection means operating as a switch for enabling to accomplish the start of the remote operation mode of the work machine.

According to an embodiment, the method further comprises carrying out said acknowledging of the work machine as being included in the safety system of the remote control station at the safety location by using said safety key.

According to an embodiment, the safety location is arranged at the remote control station or at a field station locating near the operating area.

According to an embodiment, the safety key is provided in contact with or at least in substantial vicinity of the work machine.

According to an embodiment, the work machine comprises a key cylinder individually configured according to said safety key.

According to an embodiment, the safety key comprises an electrical identification unit, wherefrom identification data of the safety key can be transmitted to an identification unit of the work machine and/or an identification unit of the remote control station.

According to an embodiment, said configuring comprises one or more of the following:
  including the work machine in a common safety system with one or more other work machines operating in the same operating area;
  including the work machine in a common remote control system with one or more other work machines operating in the same operating area;
  establishing at least one communication channel between the remote control station and the work machine;

configuring layout of a user interface of the work machine to display information about remote operating status of the work machine;

configuring layout of a user interface of the remote control station to display information about the work machine, for example by replicating the layout of the user interface of the work machine;

enabling a takeover of the control of the work machine to be remotely operated from the remote control station.

According to an embodiment, in response to the work machine being included in the safety system of the remote control station for the first time, said configuring comprises displaying safety guidance on the user interface of the remote control station.

According to an embodiment, the work machine is a rock drilling apparatus, the method further comprising obtaining information whether a remote operator on the remote control station is operating the work machine via a camera view captured from the operating area or from a viewpoint of the remote control station; and arranging a drilling pattern on the user interface of the remote control station such that orientation of the drilling pattern is adjusted according to the viewing mode selected by the remote operator.

According to an embodiment, the method further comprises arranging a map of the operating area on the user interface of the remote control station such that orientation of the map is adjusted according to the viewing mode selected by the remote operator.

According to an embodiment, the remote operator is operating the work machine via a camera view captured from the work station, and the method further comprises adjusting the orientation of the map on the user interface of the remote control station such that course of the work machine on the map is shown as pointing upwards on the user interface.

According to an embodiment, the remote control station is arranged in an active operating state or in a monitoring state, wherein the active operating state is usable in response to detecting a remote operator being present at the user interface of the remote control station.

According to an embodiment, moving the work machine remotely in the active operating state is only enabled by activating a manual actuator at the remote control station.

According to a second aspect, there is provided an apparatus arranged to initiate a remote operation mode of a work machine, wherein the work machine is provided with a work machine-specific safety key; the apparatus being arranged to receive a notification from the work machine in response to initiating the remote operation mode of the work machine by said safety key; acknowledge the work machine as being included in a safety system of a remote control station; and configure the remote control station to start the remote operation mode of the work machine.

According to a third aspect, there is provided a computer program product, stored on a non-transitory memory medium, comprising computer program code for carrying out initiate a remote operation mode of a work machine, wherein the work machine is provided with a work machine-specific safety key, the computer program code which, when executed by a processor, causes an apparatus to perform: receive a notification from the work machine in response to initiating the remote operation mode of the work machine by said safety key; acknowledge the work machine as being included in a safety system of a remote control station; and configure the remote control station to start the remote operation mode of the work machine.

According to a fourth aspect, there is provided a remotely operatable work machine, wherein the work machine is provided with a work machine-specific safety key, and the work machine is arranged to send a notification to a remote control station in response to initiating the remote operation mode of the work machine by said safety key; receive an acknowledgement indicating the work machine as being included in a safety system of the remote control station; and configure the work machine to start the remote operation mode of the work machine according to commands received from the remote control station.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a schematic representation of a rock drilling apparatus as an example of a work machine suitable for implementing the embodiments of the invention;

DESCRIPTION OF EMBODIMENTS

The presently disclosed embodiments are applicable, in particular, to various remotely operatable work machines used in mining industry. Particular examples of such work machines are mining and construction apparatuses, such as various mobile rock drilling machines. A mining apparatus may be a mobile mining apparatus, which may be referred to as a mining vehicle, or a stationary mining apparatus. It should also be noted that, in general, a mining apparatus may also refer to various machines used for rock excavation in a surface or underground operating area. In this context, the term "rock" is to be understood broadly to cover also a boulder, rock material, crust and other relatively hard material.

Figure 1:
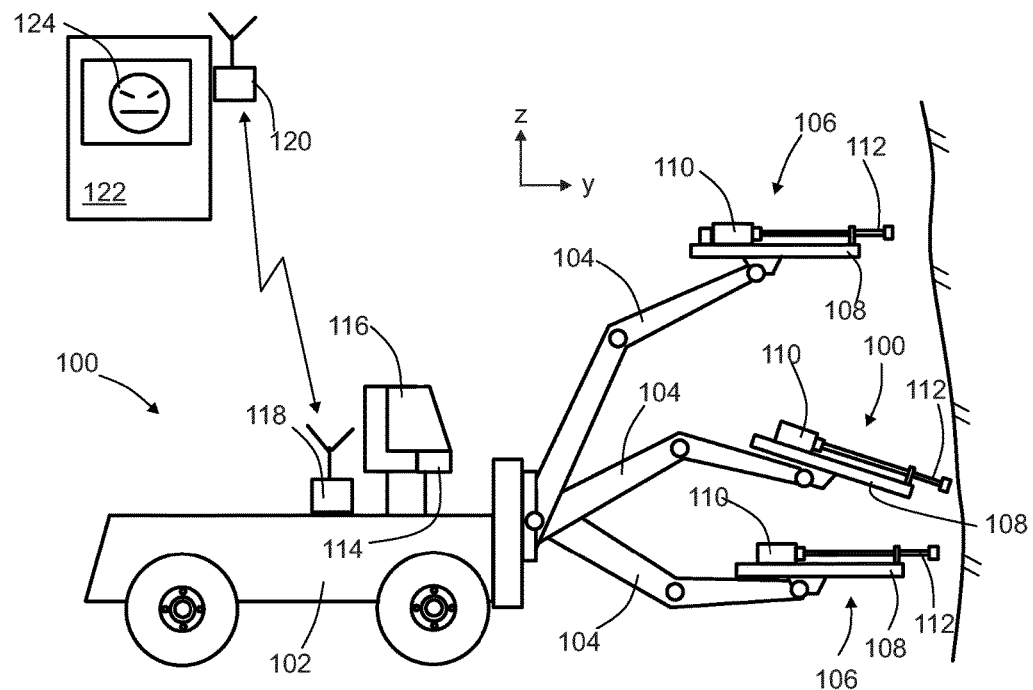

FIG. 1 shows an example of a rock drilling apparatus 100, such as a rock drilling rig comprising a movable carrier 102, one or more drilling booms 104 and drilling units 106 arranged in the drilling booms 104. The drilling unit 106 comprises a feed beam 108 on which a rock drill 110 can be moved by means of a feed motor (not shown in FIG. 1). Further, the drilling unit 106 comprises a tool 112 with which the impact pulses given by a percussion device (not shown in FIG. 1) of the rock drill 110 are transmitted to the rock to be drilled. The rock drilling apparatus typically comprises a plurality of pumps (not shown in FIG. 1) for generating hydraulic pressure for operating various parts of the apparatus, for pumping drilling fluid for lubricating, cooling, and cleaning a drilling bit, and for pumping rock cuttings from the drill holes.

The rock drilling rig 100 further comprises at least one control unit 114 arranged to control actuators of the rock drilling rig 100, the actuators being arranged in a first control system. The control unit 114 may be a computer or a corresponding device, and it may comprise a user interface with a display device as well as control means for giving commands and information to the control unit 114. The control unit 114 and its user interface are typically located within a cabin 116 of the rock drilling apparatus 100.

Further, the rock drilling apparatus 100 may have a data transfer unit 118, with which the control unit 112 may establish a data transmission connection to a second control system external to the rock drilling apparatus 100 by utilising a wireless connection provided by a base station 120. The second control system may reside at a control station 122 that may be arranged outside the mine. The control systems may be computers equipped with appropriate software. A remote operator 124 may monitor and control the operations of the rock drilling apparatus 100 via the wireless connection.

FIG. 1 is a simplified figure, and the control system of a mining vehicle, such as the rock drilling apparatus 100, typically comprises several units for implementing different control functions. The control system of the mining vehicle may be a distributed entity consisting of modules connected to a CAN (Controller Area Network) bus, for example, and managing all measurements and controls of the machine. The information system of the control station 122 may also comprise one or more servers, databases, operator workstations and a connection to other networks and systems.

The rock drilling rig of FIG. 1 is disclosed herein only as an example of a mining vehicle where the embodiments disclosed herein may be implemented. The embodiments are equally applicable to any other mining vehicles, such as various loading and transport equipment used in mines.

Despite of whatever mining vehicle is used, the control system of the mining vehicle preferably comprises a positioning system or unit. Various methods may be used for determining the location of the mining vehicle, for example, depending on whether the mining vehicle is used in surface drilling or in underground drilling. In surface drilling, it is possible to use satellite navigation, such as the GPS system, for determining the location and orientation of the mining vehicle with sufficient accuracy.

In underground drilling, the location of the mining vehicle may be determined using a tachymetry process. A sufficient number of navigation points with predetermined locations, for example in a tunnel to be excavated, are used for linking a tachymeter to the xyz coordinate system to be used. The mining vehicle is provided with targets, the locations of which in relation to the origin of the coordinate system of the mining vehicle have been determined. The tachymeter is used for continuously measuring the xyz coordinates of the targets. Moreover, at least one point of the drilling pattern is determined in a level of navigation. On the basis of these data, possibly together with a curvature table, the length of the drilling pattern and the inclination of the mining vehicle, the mining vehicle may determine its location and the location and the orientation of the drilling pattern.

Furthermore, regardless of whether a satellite navigation or a tachymetry process is used for determining the location of the mining vehicle, the mining vehicle and its sub-units, such as the drilling apparatus having its booms and drilling unit, are preferably provided with sufficient number of sensors, such as gyroscopes, compass sensors, inclinometers, rotary encoders, linear encoders and accelerometers, for ensuring sufficient hole position accuracy both for the feed alignment and the drilling process. As a result, when the mining vehicle navigated with sufficient accuracy carries out a drilling process according to a drilling pattern, exact locations are obtained for the drilled holes and they can be exactly located in the coordinate system of the job site to be used as future reference holes.

Thus, the operations of the mining vehicle may be remotely controlled and monitored, as well as be automated to be carried out at least partly autonomously.

Figure 2:
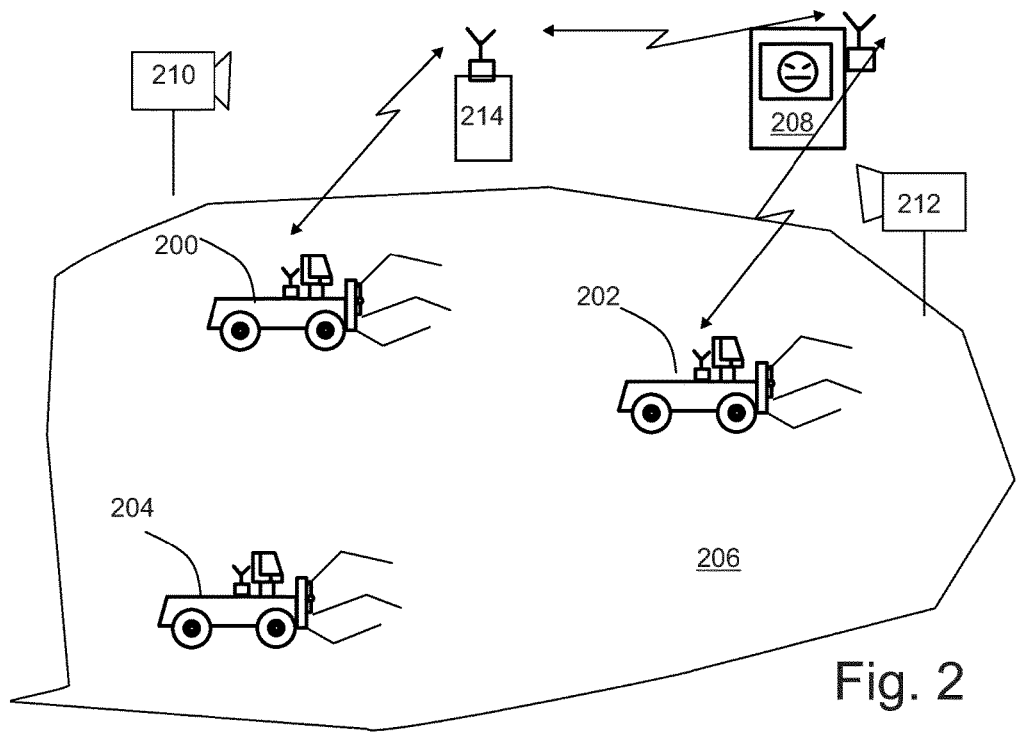
FIG. 2 shows a schematic representation of operating a fleet of work machines remotely.

FIG. 2 illustrates the principle of operating a plurality of work machines (i.e. a fleet) remotely in the same operating area. Herein, the fleet comprises three work machines 200, 202, 204, which are monitored and controlled from a remote control station 208 locating outside the operating area 206. In underground mines, the remote control station may be located on the ground surface, whereupon a plurality of camera 210, 212 may be provided in the operating area for monitoring the operations. Also the work machines are typically provided with cameras. The views captured by the cameras are transmitted to the remote control station. In surface mining, the remote control station may be provided, for example, in a vehicle, such as a van, where the control station comprises computers equipped with necessary user interfaces, such as one or more displays and appropriate software.

A wireless data connection is established between the remote control station 208 and the work machines 200, 202, 204 belonging to the fleet. The work machines send intermittently various sensor data and video describing the operations of the work machines to the control station via the wireless connection. A remote operator may monitor and control the operations of the mining vehicles.

The remote control station may also locate very far from the operating area, in principle anywhere around the world, as long as there is data connection arranged between the remote control station 208 and the work machines 200, 202, 204 belonging to the fleet. In such case, there is a field station 214 arranged in the vicinity of the operating area, the field station comprising at least a wireless base station for arranging the wireless data connection to the work machines and a wireless/wired data connection to remote control station. The field station may further comprise control functionalities for enabling at least some controls (e.g. safety functions) to be carried out manually at the operating area. The field station may further comprise e.g. various diagnostic and configuration functionalities for the fleet.

The operating area 206 may be isolated by passage control devices equipped with sensors connected to a safety system. When a signal indicating border crossing is received from a passage control device, a work machine in automated or remote operation is stopped immediately.

Also the software of the remote control stations are provided with many built-in safety functions. For activating a work machine of the fleet to an automated operation mode, the remote operator has to carry out several activation stages, including introducing a new work machine into the fleet, if necessary, selecting the correct work machine from the available fleet, determining the operating area (e.g. a correct tunnel), activating necessary control channels over the wireless connection, etc. All these stages contribute to the safety such that no work machine should be able to be activated by accident.

However, similarly to all operating systems, also the software of the remote control station is typically a compromise between safety and usability. The software may, for example, show data about all work machines ever used by said remote control station, and the remote operator may just select the correct vehicle. While the overwhelming amount of data about all work machines may provide advantages from the usability point of view, it inherently also poses a risk of the remote operator selecting a wrong work machine to be activated.

Figure 3:
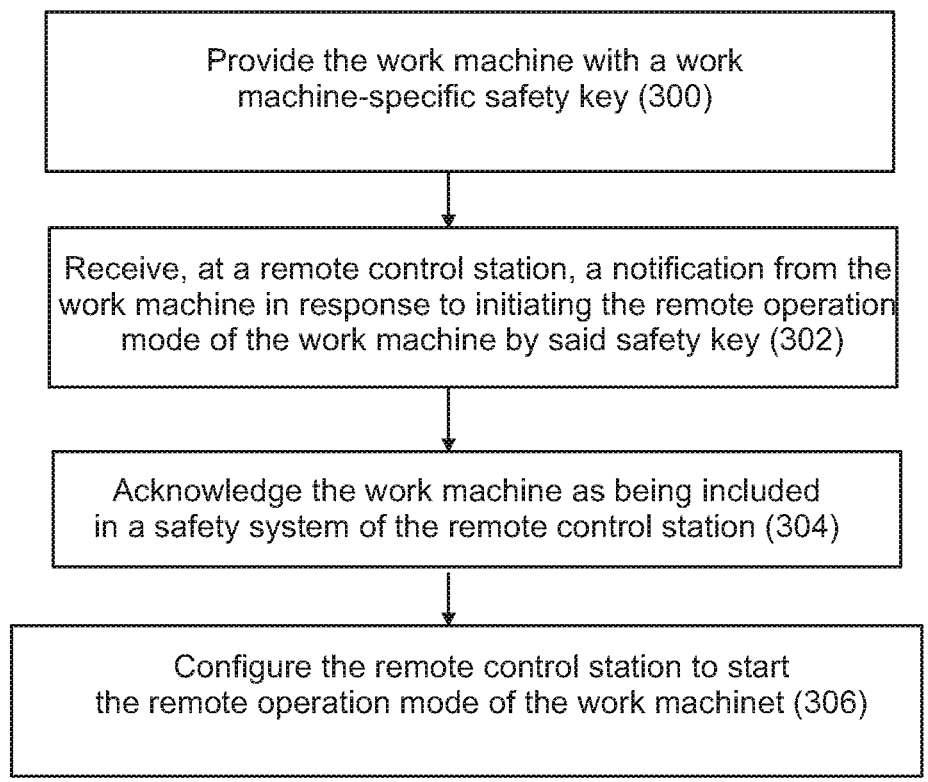
FIG. 3 shows a flow chart of a method for initiating a remote operation mode of a work machine according to an embodiment of the invention.

Now according to an aspect of the invention, the safety of initiating a remote operation mode of a work machine is enhanced by introducing a work machine-specific safety key. FIG. 3 illustrates a method for initiating a remote operation mode of a work machine, such as the rock drilling apparatus.

The work machine is provided (300) with a work machine-specific safety key. A notification is received (302) at a remote control station from the work machine in response to initiating the remote operation mode of the work machine by said safety key. The remote control station acknowledges (304) the work machine as being included in a safety system of the remote control station, and the remote control station is configured (306) to start the remote operation mode of the work machine.

In other words, when the initiation of the remote operation mode of the work machine can only be carried out by the work machine-specific safety key, unintentional initiation is avoided and the safety of the remote operation mode is improved. Other actions relating to the initiation of the remote operation mode may only be taken at the remote control station, when a notification has been received from the work machine that the individual work machine-specific safety key has been used at the work machine to start the remote operation mode. In practice, the operator at the remote station or some other member of the personnel shall personally use the safety key at the work machine for initiating the remote operation mode, and then bring the safety key away from the work machine.

According to an embodiment, all the other actions relating to the initiation of the remote operation mode may only be taken at the remote control station, if the safety key has been returned to a predetermined safety location. Herein, the safety location may refer to the remote control station, or if the remote control station is located very far from the operating area, the safety location may refer to the field station. Thus, it may be required for safety reasons that the person carrying out the initiation of the remote operation mode of the work machine shall bring the safety key back to the safety location before the start of the remote operation mode of the work machine can be accomplished. For example, it may be possible that a part of said other actions relating to the initiation of the remote operation mode may be taken in response to the initiation carried out by said safety key, but the actual remote operation of the work machine may only be started when the safety key has been brought back to the safety location.

The safety location may comprise detection means, such as a specific receptacle or a sensor arranged to detect the presence of the safety key, whereby said detection means may operate as a switch for enabling to accomplish the start of the remote operation mode of the work machine. If the safety location is located at the field station, the filed station sends a control signal to the remote control station for enabling to accomplish the start of the remote operation mode.

According to an embodiment, it may be required that said acknowledging (304) of the work machine as being included in the safety system of the remote control station must be carried out at the safety location by using said safety key. This improves the safety of the arrangement by ensuring that the safety key used at the work machine has been brought back to the safety location.

According to another embodiment, it may be required that the safety key must be remained at the work machine during the remote operation mode. In such an embodiment, all the other actions relating to the initiation of the remote operation mode may be taken at the remote control station only if it is detected that the safety key is present at the work machine.

According to an embodiment, the safety key is provided in contact with or at least in substantial vicinity of the work machine. Since the safety key must be in physical contact with the work machine or at least very close to the work machine, the personnel, e.g. the remote operator must bring the safety key to the work machine. The individual key evidently cannot be in two places simultaneously and thereby bringing the safety key to the work machine further enhances the safety.

According to an embodiment, the work machine comprises a key cylinder individually configured according to said safety key. In a case where the safety key must be in physical contact with the work machine, the safety may be further improved by configuring the design of the safety key (grooves, cavities, etc.) to fit only with the key cylinder of the work machine.

According to an embodiment, the safety key comprises an electrical identification unit, wherefrom identification data of the safety key can be transmitted, either wirelessly or via a wired connection, to an identification unit of the work machine. Thus, it may suffice that the safety key is provided in substantial vicinity of the work machine, e.g. inside the cabin of the work machine, whereafter the identification data of the safety key can be read by the work machine. The identification data of the safety key may comprise e.g. an RFID (Radio Frequency Identification) tag or it may be provided with a NFC (Near-Field Communication) transmitter for transmitting the identification data.

According to an embodiment, said configuring comprises one or more of the following:
  including the work machine in a common safety system with one or more other work machines operating in the same operating area;
  including the work machine in a common remote control system with one or more other work machines operating in the same operating area;
  establishing at least one communication channel between the remote control station and the work machine;
  configuring layout of a user interface of the work machine to display information about remote operating status of the work machine;
  configuring layout of a user interface of the remote control station to display information about the work machine, for example by replicating the layout of the user interface of the work machine;
  enabling a takeover of the control of the work machine to be remotely operated from the remote control station.

If there are one or more work machines already operating in the same operating area, the newly introduced work machine shall preferably first be included in the same safety system and the same remote control system in order for the remote operator to be able to securely control the operation of all work machines. When the necessary data for the safety system and the remote control system has been included in and acknowledged by the remote control system, at least one communication channel between the remote control station and the work machine can be established.

The layout of the user interface of the remote control station may then be configured to display information about the work machine, and also to correspond to the number of the work machines currently operating in the same operating area.

According to an embodiment, the layout of the user interface of the work machine is configured to display information about remote operating status of the work machine, and only then the layout of the user interface of the remote control station is configured to display information about the work machine by replicating the user interface of the work machine. Thus, it is ensured that the user interface of the remote control station corresponds accurately to the user interface of the work machine.

For enabling a takeover of the control of the work machine to be remotely operated from the remote control station, the user interface of the remote control station may be provided with necessary commands, e.g. a button, for starting the remote operation of the work machine.

Figure 4A:
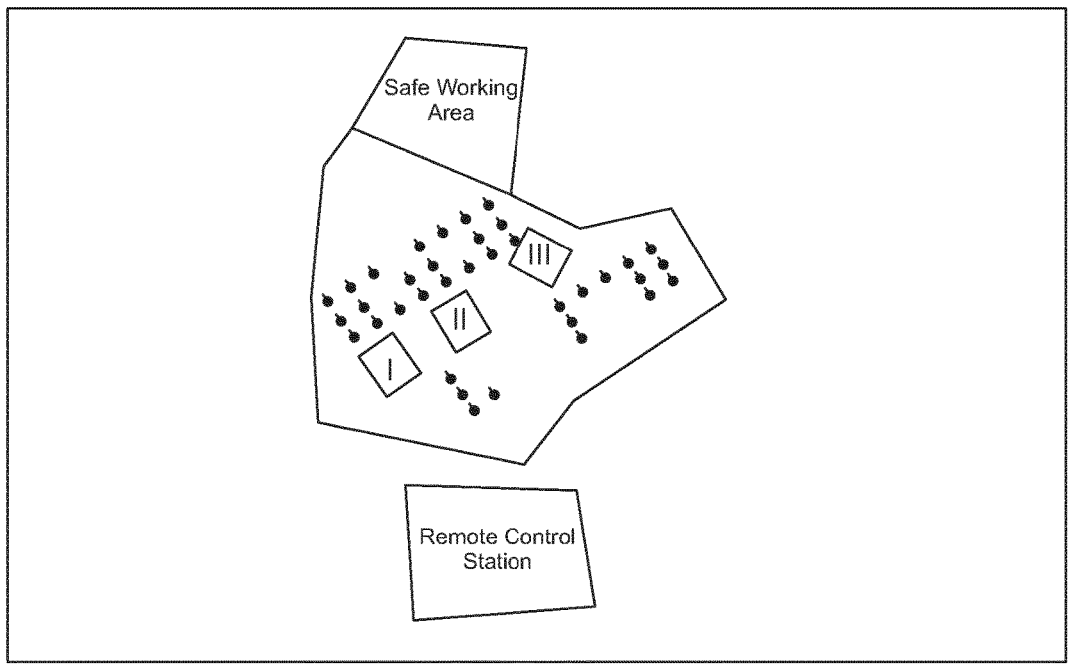
FIGS. 4a, 4b show user interface layouts of the remote control station according to some embodiments of the invention.
Figure 4B:
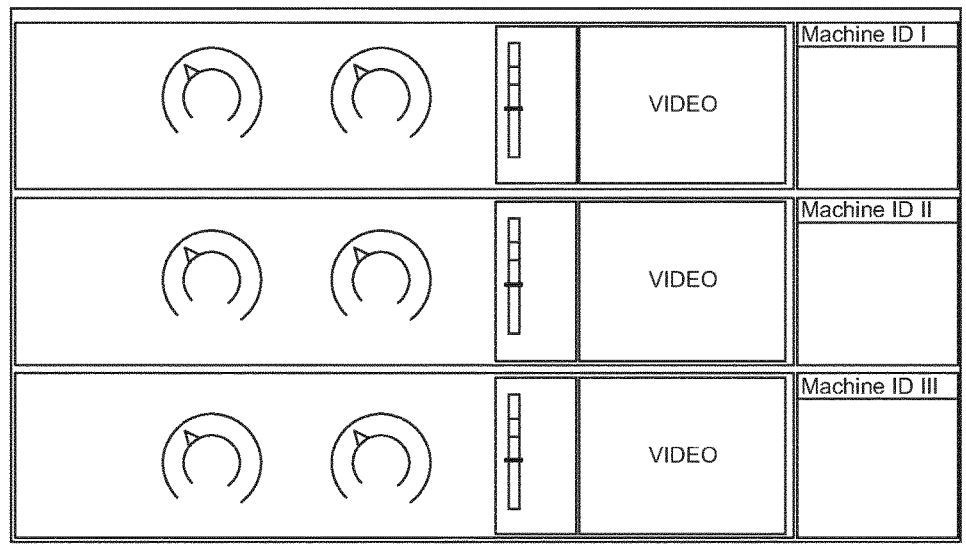

FIGS. 4a and 4b show examples of user interface layouts of the remote control station capable for displaying at least some of the above embodiments. In this example, it is assumed that the user interface comprises at least two displays. The first display (FIG. 4a) shows a map of the operating area, a drilling pattern adjusted to the map and three work machines (I, II, III) currently operating in the operating area. The drilling pattern is an operation plan for a rock drilling apparatus, the drilling pattern comprising at least the locations and the hole direction angles of the holes to be drilled in the coordinate system of the drilling pattern, as well as the lengths of the holes to be drilled. The second display (FIG. 4b) shows rows of operating information about each of the work machines.

In the FIGS. 4a and 4b, the work machines I and II have been operating in the operating area previously, and the work machine III is the newly introduced work machine. Upon introducing the work machine III to the remote control system, the icon of the work machine III is created on the first display, and a third row of operating information is created on the second display. Hence, the layout of the user interface of the remote control station may then be configured to display information about the work machine, and also to correspond to the number of the work machines currently operating in the same operating area. The size of the operating information rows on the second display adjusts according to the number of work machines. Thus, the display area is always in optimal use during the operation.

The remote operator may take over the control of the work machine to be remotely operated, for example, by clicking the icon of work machine on the first display, or by tapping anywhere in the operating information row of the particular work machine in the second display.

According to an embodiment, in response to the work machine being included in the safety system of the remote control station for the first time, said configuring comprises displaying safety guidance on the user interface of the remote control station. Herein, the first time may refer to any occasion, where the work machine has been excluded from the safety system for a while. The first time may refer to the first time during the working day, the first time after a lunch break, the first time after returning from a service, etc. The safety guidance displayed on the UI may vary depending on what kind of occasion is concerned.

The safety guidance may comprise, besides specific safety instructions to be shown on the display, also safety tests to be carried out to the work machine via the remote connection. The safety tests may be simple, as such, the purpose of them just being to ensure that there is no risk of hazard when starting the remote operation for the first time. The safety tests may involve, for example, flashing the headlights of the work machine to ensure that a correct work machine has been selected, checking from the camera view that the work machine is not outside the operating area, displaying certain meter values of the work machines, etc.

A further problem possibly encountered when remotely operating work machines, especially rock drilling apparatuses, in a mine is that even though a lot of visual information about the operating area is available at the remote control station, the illustrativeness of the visual information may be inadequate such that there may be a risk of misinterpreting e.g. the direction of motion of the work machine, when starting the remote operation. As can be seen in FIG. 4a, the remote operator is provided with a map view about the operating area. The drilling pattern may be overlaid to the map. Moreover, there may be a plurality of camera views provided from the operating area. There may be one or more cameras arranged in the work machine to capture views directly around the work machine. There may be one or more cameras arranged around the operating area such that maximum visibility over the operating area is aimed to be achieved. On the other hand, the remote control station may be implemented in a vehicle, such as a van, which is located outside the operating area, and in addition to or instead of the camera views over the operating area, the remote operator may monitor the work machines by watching from a window of the remote control station.

A problem noticed herein is that in most cases neither the drilling pattern nor the map view is in orientation with the camera/window view seen by the remote operator. This may pose challenges to observe and interpret the course of the work machine when moving it in the operating area.

Thus, according to an embodiment, the work machine is a rock drilling apparatus, and the method further comprises obtaining information whether a remote operator on the remote control station is operating the work machine via a camera view captured from the operating area or from a viewpoint of the remote control station; and arranging a drilling pattern on the user interface of the remote control station such that orientation of the drilling pattern is adjusted according to the viewing mode selected by the remote operator.

Thereby, the orientation of the drilling pattern is adjusted in a two- (2D) or three-dimensional (3D) plane such that that orientation of the drilling pattern corresponds to the viewing mode selected by the remote operator. The viewing mode may refer to at least a camera view captured from the work station, a camera view captured from outside the operating area or the viewpoint of the remote control station.

According to an embodiment, a map of the operating area may be arranged on the user interface of the remote control station such that orientation of the map is adjusted according to the viewing mode selected by the remote operator.

According to an embodiment, the remote operator is operating the work machine via a camera view captured from the work station, whereupon the orientation of the map is adjusted on the user interface of the remote control station such that course of the work machine on the map is shown as pointing upwards on the user interface.

Consequently, when the remote operator starts to operate a work machine or changes to operate another work machine, the improved visual layout of the user interface views relating to the drilling pattern and/or the map enable the remote operator more easily to observe and interpret the course of the work machine when moving it in the operating area. This improves the safety and usability of the remote operating system.

A further safety issue encountered in a remote operating mode is that the remote operator has more liberties regarding his/her activities in the remote control station than e.g. an operator driving manually the work machine in the cabin of the work machine. A remote operator may, for example, walk around in the remote station and unintentionally leave the work machine in a remote operating mode without any control and supervision.

According to an embodiment, the remote control station is arranged in an active operating state or in a monitoring state, wherein the active operating state is usable in response to detecting a remote operator being present at the user interface of the remote control station.

For example, the detecting of the remote operator being present at the user interface of the remote control station may be linked to a chair of the remote operator, wherein a pressure sensor may detect whether the remote operator is sitting in the chair. Another example of the means for detecting the presence of the operator is a mat provided with a pressure sensor, the mat locating e.g. in front of the user interface of the remote control station.

Only when the remote control station is arranged in an active operating state (i.e. the remote operator is present at the user interface of the remote control station), the work machine can be selected to be remotely operated. Initiating any automated operation of the work machine is only possible in the active operating state. When it is detected that the remote operator is no longer present at the user interface of the remote control station (e.g. no appropriate signal from the pressure sensor), the remote control station automatically shifts into the monitoring state. The work machine is turned into inactive state at the remote control station and the remote control of the work machine ceases to operate anymore. In some cases, automated operations started during the active operating state may nevertheless continue.

Thus, leaving the work machine unintentionally in a remote operating mode, thereby causing a risk of hazard, can now be avoided. At the same time, no extra observance is required from the remote operator, but the enhanced safety is achieved as a part of the normal operation.

According to an embodiment, the safety in the active operating state may be further enhanced by a manual actuator, which the remote operator needs manually activate in order to move the work machine. The manual actuator may be, for example, a pedal, a joystick or a button provided at the remote control station. Thus, it must be first ensured that the remote control station is arranged in an active operating state, i.e. the remote operator is present at the user interface of the remote control station, and then by activating the manual actuator, the remote operator may, for example, move the work machine, such as a drilling rig to a next hole to be drilled. As a result, when moving the work machine in the active operating state, it does not suffice that the remote operator is present at the user interface of the remote control station, but he/she must also actively control the work machine, thus increasing the level of safety.

A skilled person appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, a work machine may comprise circuitry and electronics for handling, receiving and transmitting data, computer program code in a memory, and a processor that, when running the computer program code, causes the machine to carry out the features of an embodiment.

Figure 5:
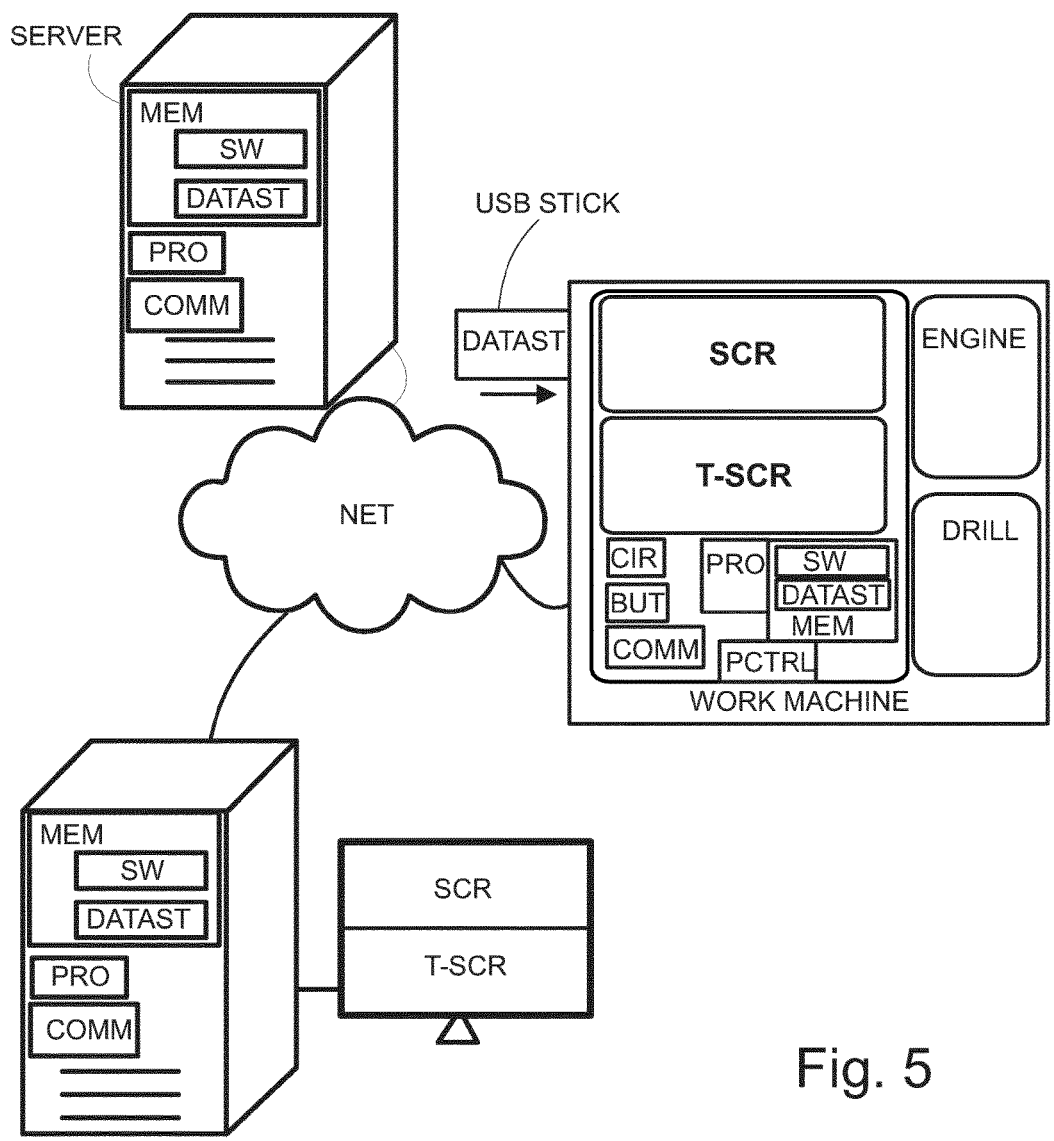
FIG. 5 shows a block diagram of a system for carrying out the control method of a work machine.

FIG. 5 shows a block diagram of a system for carrying out a control process of the work machine. The system comprises one or more processors PRO, and memory MEM. The processors and memory may be in one part of the system or distributed across different parts and different apparatuses. For example, a work machine control interface may have its own processor and/or memory, a computer connected to the work machine its own processor and memory, and other parts of the system their own. The memory MEM may comprise software SW executable on the processor PRO so that the system may display items to the operator via a screen SCR and accept input through buttons BUT, physical controls PCTRL like levers and joysticks, and/or through a touch screen T-SCR. A part or all of the steps of an embodiment may be carried out in software, and a part or all of the steps may be carried out by control circuitry CIR. The software may reside on a computer-readable non-transitory medium such as a USB stick or a data disc, and the computer program code is stored on said medium. Such a computer program product may be used to deliver the functionalities of the invention to a system by installation or by using the computer-readable medium directly for executing the program therefrom. The system may comprise communication modules COMM for sending and receiving data between the different parts and apparatuses of the system.

As a further aspect of the invention, there is provided computer program product, stored on a non-transitory memory medium, comprising computer program code for carrying out initiate a remote operation mode of a work machine, wherein the work machine is provided with a work machine-specific safety key, the computer program code which, when executed by a processor, causes an apparatus to perform: receive a notification from the work machine in response to initiating the remote operation mode of the work machine by said safety key; acknowledge the work machine as being included in a safety system of a remote control station; and configure the remote control station to start the remote operation mode of the work machine.

The various embodiments of the invention may be implemented as co-functional modules in the work machine, the modules being preferably replaceable as such. The modules may be implemented as hardware, software or a combination of them.

It is obvious that the present invention is not limited solely to the above-presented embodiments, but it can be modified within the scope of the appended claims.

The invention claimed is:

1. A method for initiating a remote operation mode of a mining vehicle, the method comprising the steps of:
   providing the mining vehicle with a mining vehicle-specific safety key to initiate a remote operation mode, the safety key being in contact with or at least in the vicinity of the mining vehicle;
   receiving, at a remote control station, a notification from the mining vehicle in response to initiating a remote operation mode of the mining vehicle by said safety key;
   acknowledging the mining vehicle as being included in a safety system of the remote control station; and
   configuring the remote control station to start the remote operation mode of the mining vehicle.

2. The method according to claim 1, wherein at least a part of actions relating to the initiation of the remote operation mode are allowed to be taken at the remote control station only if the safety key has been returned to a predetermined safety location.

3. The method according to claim 2, wherein the safety location includes a detection device arranged to detect a presence of the safety key, said detection device operating as a switch for enabling to accomplish the start of the remote operation mode of the mining vehicle.

4. The method according to claim 2, further comprising carrying out said acknowledging of the mining vehicle as being included in the safety system of the remote control station at the safety location by using said safety key.

5. The method according to claim 2, wherein the safety location is arranged at the remote control station.

6. The method according to claim 2, wherein the safety location is arranged at a field station locating near the operating area.

7. The method according to claim 1, wherein the safety key is provided in contact with or at least in substantial vicinity of the mining vehicle.

8. The method according to claim 7, wherein the mining vehicle and/or the remote control station includes a key cylinder individually configured according to said safety key.

9. The method according to claim 7, wherein the safety key includes an electrical identification unit, wherefrom identification data of the safety key can be transmitted to an identification unit of the mining vehicle and/or an identification unit of the remote control station/field station.

10. The method according to claim 1, wherein said configuring step includes one or more of the following steps:
including the mining vehicle in a common safety system with one or more other mining vehicles operating in the same operating area;
including the mining vehicle in a common remote control system with one or more other mining vehicles operating in the same operating area;
establishing at least one communication channel between the remote control station and the mining vehicle;
configuring layout of a user interface of the mining vehicle to display information about remote operating status of the mining vehicle;
configuring layout of a user interface of the remote control station to display information about the mining vehicle, such as by replicating the layout of the user interface of the mining vehicle; and
enabling a takeover of the control of the mining vehicle to be remotely operated from the remote control station.

11. The method according to claim 10, wherein, in response to the mining vehicle being included in the safety system of the remote control station for the first time, said configuring includes displaying safety guidance on the user interface of the remote control station.

12. The method according to claim 1, wherein the mining vehicle is a rock drilling apparatus, the method further comprising the steps of:
obtaining information whether a remote operator on the remote control station is operating the mining vehicle via a camera view captured from the operating area or from a viewpoint of the remote control station; and
arranging a drilling pattern on the user interface of the remote control station such that orientation of the drilling pattern is adjusted according to the viewing mode selected by the remote operator.

13. The method according to claim 12, further comprising arranging a map of the operating area on the user interface of the remote control station such that orientation of the map is adjusted according to the viewing mode selected by the remote operator.

14. The method according to claim 13, wherein the remote operator is operating the mining vehicle via a camera view captured from the work station, the method further comprising adjusting the orientation of the map on the user interface of the remote control station such that course of the mining vehicle on the map is shown as pointing upwards on the user interface.

15. The method according to claim 1, wherein the remote control station is arranged in an active operating state or in a monitoring state, wherein the active operating state is usable in response to detecting a remote operator being present at the user interface of the remote control station.

16. The method according to claim 15, wherein moving the mining vehicle remotely in the active operating state is only enabled by activating a manual actuator at the remote control station.

17. A computer program product, stored on a non-transitory memory medium, comprising computer program code to initiate a remote operation mode of a mining vehicle, wherein the mining vehicle is provided with a mining vehicle-specific safety key, the safety key being in contact with or at least in the vicinity of the mining vehicle, the computer program code which, when executed by a processor, causes an apparatus to:
receive a notification from the mining vehicle in response to initiating the remote operation mode of the mining vehicle by said safety key;
acknowledge the mining vehicle as being included in a safety system of a remote control station; and
configure the remote control station to start the remote operation mode of the mining vehicle.

18. The computer program product according to claim 17, wherein the computer program code which, when executed by the processor, causes the apparatus to configure the remote control station by one or more of the following actions:
including the mining vehicle in a common safety system with one or more other mining vehicles operating in the same operating area;
including the mining vehicle in a common remote control system with one or more other mining vehicles operating in the same operating area;
establishing at least one communication channel between the remote control station and the mining vehicle;
configuring layout of a user interface of the mining vehicle to display information about remote operating status of the mining vehicle;
configuring layout of a user interface of the remote control station to display information about the mining vehicle, such as by replicating the layout of the user interface of the mining vehicle; and
enabling a takeover of the control of the mining vehicle to be remotely operated from the remote control station.

19. A remotely operable mining vehicle, wherein the mining vehicle is provided with a mining vehicle-specific safety key arranged to initiate a remote operation mode, the safety key being in contact with or at least in the vicinity of the mining vehicle and the mining vehicle being arranged to send a notification to a remote control station in response to initiating the remote operation mode of the mining vehicle by said safety key; receive an acknowledgement indicating the mining vehicle as being included in a safety system of the remote control station; and configure the mining vehicle to start the remote operation mode of the mining vehicle according to commands received from the remote control station.

20. The mining vehicle according to claim 19, wherein the commands received from the remote control station configure the mining vehicle to start the remote operation mode of the mining vehicle according to by one or more of the following actions:
- including the mining vehicle in a common safety system with one or more other mining vehicles operating in the same operating area;
- including the mining vehicle in a common remote control system with one or more other mining vehicles operating in the same operating area;
- establishing at least one communication channel between the remote control station and the mining vehicle;
- configuring layout of a user interface of the mining vehicle to display information about remote operating status of the mining vehicle;
- configuring layout of a user interface of the remote control station to display information about the mining vehicle, such as by replicating the layout of the user interface of the mining vehicle; and
- enabling a takeover of the control of the mining vehicle to be remotely operated from the remote control station.

* * * * *